United States Patent
Wilson et al.

(10) Patent No.: US 10,901,902 B2
(45) Date of Patent: Jan. 26, 2021

(54) EFFICIENT INCLUSIVE CACHE MANAGEMENT

(71) Applicant: INTERNATIONAL BUSINESS MACHINES CORPORATION, Armonk, NY (US)

(72) Inventors: Chad G. Wilson, Poughkeepsie, NY (US); Robert J Sonnelitter, III, Mount Vernon, NY (US); Tim Bronson, Round Rock, TX (US); Ekaterina M. Ambroladze, Somers, NY (US); Hieu T Huynh, Austin, TX (US); Jason D Kohl, Austin, TX (US); Chakrapani Rayadurgam, Kumaraswamy Layout II Stage Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 28 days.

(21) Appl. No.: 16/360,254

(22) Filed: Mar. 21, 2019

(65) Prior Publication Data
US 2020/0301831 A1    Sep. 24, 2020

(51) Int. Cl.
*G06F 12/10* (2016.01)
*G06F 12/084* (2016.01)

(52) U.S. Cl.
CPC ........ *G06F 12/084* (2013.01); *G06F 2212/60* (2013.01)

(58) Field of Classification Search
USPC ....................................................... 711/130
See application file for complete search history.

(56) References Cited

U.S. PATENT DOCUMENTS

| 7,552,288 B2 | 6/2009 | Iyer et al. |
| 7,761,594 B1 | 7/2010 | Mowat |
| 8,843,707 B2 | 9/2014 | Daly et al. |
| 9,323,676 B2 | 4/2016 | Bronson et al. |
| 10,114,749 B2 | 10/2018 | Tu et al. |

(Continued)

OTHER PUBLICATIONS

Albericio, Jorge, et al., "The Reuse Cache: Downsizing the Shared Last-Level Cache," Proceedings of the 46th Annual IEEE/ACM International Symposium on Microarchitecture, pp. 310-321, ACM, 2013.

(Continued)

*Primary Examiner* — Jae U Yu
(74) *Attorney, Agent, or Firm* — Cantor Colburn LLP; William Kinnaman (57) ABSTRACT

Methods and systems for cache management are provided. Aspects include providing a drawer including a plurality of clusters, each of the plurality of clusters including a plurality of processor each having one or more cores, wherein each of the one or more cores shares a first cache memory, providing a second cache memory shared among the plurality of clusters, and receiving a cache line request from one of the one or more cores to the first cache memory, wherein the first cache memory sends a request to a memory controller to retrieve the cache line from a memory, store the cache line in the first cache memory, create a directory state associated with the cache line, and provide the directory state to the second cache memory to create a directory entry for the cache line.

13 Claims, 4 Drawing Sheets

(56) References Cited

U.S. PATENT DOCUMENTS

2002/0065988 A1*  5/2002  Lasserre ............. G06F 12/0846
                                                      711/122
2008/0082745 A1*  4/2008  Takada ................... G06F 3/061
                                                      711/113
2016/0232107 A1   8/2016  Ros et al.

OTHER PUBLICATIONS

Zhao, Li, et al., "NCID: A Non-inclusive Cache, Inclusive Directory Architecture for Flexible and Efficient Cache Hierarchies," Proceedings of the 7th ACM International Conference on Computing Frontiers, pp. 121-130, ACM, 2010.

* cited by examiner

EFFICIENT INCLUSIVE CACHE MANAGEMENT

BACKGROUND

The present invention generally relates to data processing, and more specifically, to efficient inclusive cache management in a large symmetric multiprocessing computer system.

Contemporary high-performance computer systems are typically implemented as multi-node, symmetric multiprocessing ('SMP') computers with many compute nodes. SMP is a multi-processor computer hardware architecture where two or more, typically many more, identical processors are connected to a single shared main memory and controlled by a single operating system. Most multiprocessor systems today use an SMP architecture. In the case of multi-core processors, the SMP architecture applies to the cores, treating them as separate processors. Processors may be interconnected using buses, crossbar switches, mesh networks, and the like. Each compute node typically includes a number of processors, each of which may have at least some local memory, at least some of which is accelerated with cache memory. The cache memory can be local to each processor, local to a compute node shared across more than one processor, or shared across nodes. All of these architectures require maintenance of cache coherence among the separate caches.

SUMMARY

Embodiments of the present invention are directed to a computer-implemented method for cache management. A non-limiting example of the computer-implemented method includes providing a drawer including a plurality of clusters, each of the plurality of clusters including a plurality of processor each having one or more cores, wherein each of the plurality of processors shares a first cache memory, providing a second cache memory shared among the plurality of clusters, and receiving a cache line request from one of the one or more cores to the first cache memory, wherein the first cache memory sends a request to a memory controller to retrieve the cache line from a memory, store the cache line in the first cache memory, create a directory state associated with the cache line, and provide the directory state in the second cache memory to create a directory entry for the cache line.

Embodiments of the present invention are directed to a system for cache management. A non-limiting example of the system includes a drawer including a plurality of clusters, each of the plurality of clusters including a plurality of processors each having one or more cores, wherein each of the plurality of processors shares a first cache memory, and a second cache memory shared among the plurality of clusters, wherein the first cache memory is configured to receive a cache line request from one of the one or more cores and send a request to a memory controller to retrieve the cache line from a memory, store the cache line in the first cache memory, create a directory state associated with the cache line, and provide the directory state to the second cache memory to create a directory entry for the cache line.

Embodiments of the present invention are directed to a symmetric multiprocessing computing system. A non-limiting example of the symmetric multiprocessing computing system includes a plurality of drawers, each drawer including a drawer including a plurality of clusters, each of the plurality of clusters including a plurality of processors each having one or more cores, wherein each of the plurality of processors shares a first cache memory, and a second cache memory shared among the plurality of clusters, wherein the first cache memory is configured to receive a cache line request from one of the one or more cores and send a request to a memory controller to retrieve the cache line from a memory, store the cache line in the first cache memory, create a directory state associated with the cache line, and provide the directory state to the second cache memory to create a directory entry for the cache line.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter is particularly pointed out and distinctly claimed in the claims at the conclusion of the specification. The foregoing and other features, and advantages of the embodiments herein are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, in modern multi-processor computer systems, a hierarchy of caches is used to buffer memory cache lines in order to reduce the access time overhead of data in memory. Highly distributed, large symmetric multiprocessing (SMP) systems utilize can share high-level cache (e.g., L4 cache). Prior SMP systems required tradeoffs to be made between the amount of available L4 cache and the level of connectivity between processors to accommodate cost and packaging constraints. Existing SMP systems can include multiple drawers, where each drawer contains two independent and separate nodes. These nodes in turn each contain multiple central processing (CP) chips (e.g., integrated circuits) connected together with a dedicated shared cache (SC) chip. Each CP chip is a chip multiprocessor (CMP) with a private L1 and L2 cache per processor and one L3 cache shared by all the processors on the chip. Each CP has multiple cores that have their own L1 and L2 cache, and each core shares the L3 cache that they are connected to on the CP. For example, a CP is made of 12 cores, 1 shared L3 cache, and 1 memory controller. The SC chip includes an L4 cache and system interconnect logic.

Figure 1:
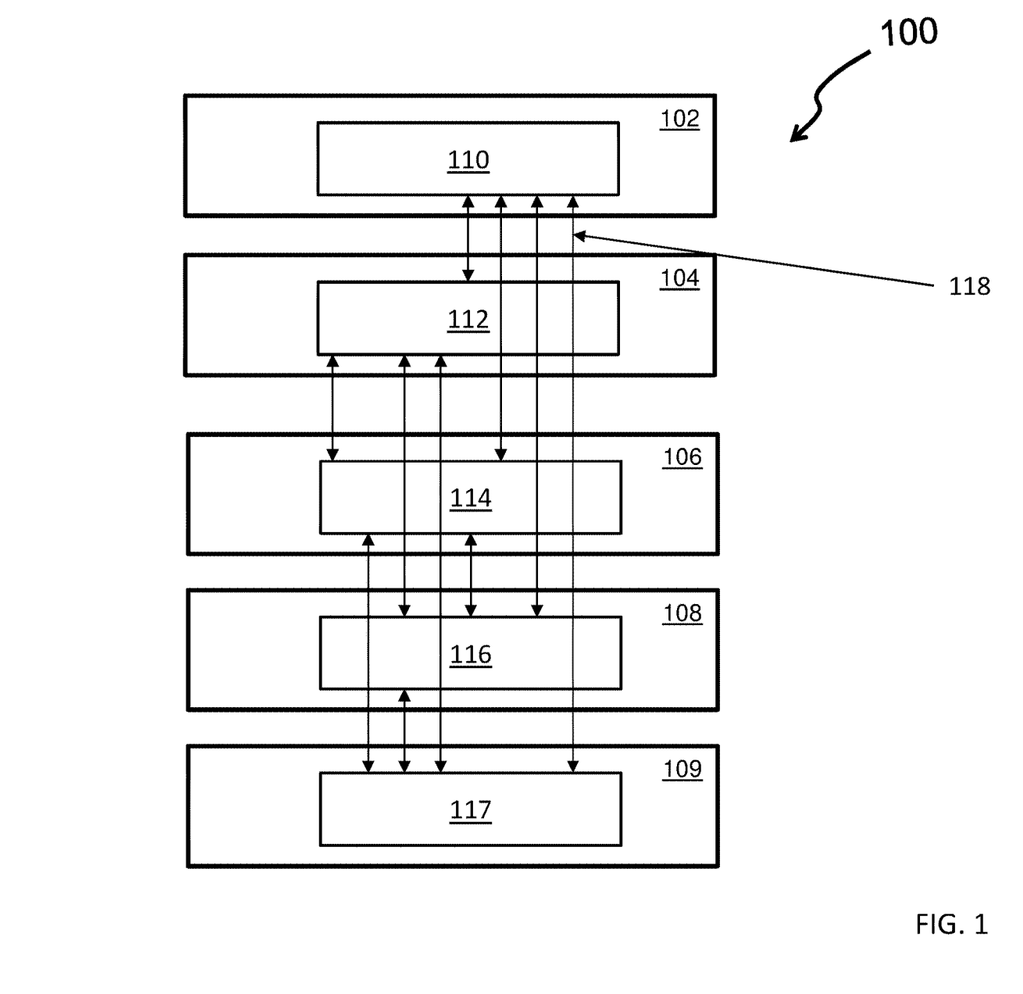
FIG. 1 depicts a block diagram of a distributed symmetric multiprocessing (SMP) system in accordance with one or more embodiments of the invention.

Turning now to a more detailed description of aspects of the present invention, FIG. 1 depicts a distributed symmetric multiprocessing (SMP) system 100 (hereafter "system 100") in accordance with one or more embodiments. System 100 can include 5 processing units or "drawers." Drawer 102 (described in greater detail with respect to FIG. 2) connects to drawer 104, drawer 106, drawer 108, and drawer 110 via a shared cache (SC) chip (sometimes referred to as an integrated circuit (IC) or as a system chip) 110. Drawers 104, 106, 108, and 109 each have a respected SC chip (e.g., SC chip 112, SC chip 114, SC chip 116, SC chip 117). Bus lines 118 connect drawers 102, 104, 106, 108, 109. Intra-drawer coherency communication may be performed using pass-through and a combination of these bus-lines, 118.

In an embodiment, cache lines are managed by a cache coherency protocol within the system 100. A cache miss is a failed attempt to read or write a piece of data in the cache which can result in longer latency. Inclusive cache misses are an invalid state in the system 100 detected using a modified exclusive shared invalid (MESI) protocol for coherency. Inclusive cache misses refers to when going from a high cache (e.g., L1) to a lower cache (e.g., L2→L3→L4), that if the higher level cache owns a copy of a cache line defined by the MESI, the lower caches will also have owning a copy of the cache line. Owning a line means not Invalid in the MESI protocol. The L1 caches and the L2 caches are not connected horizontally so that if an L1 cache experiences a miss, the L2 cache will be checked on the same core, and if the L2 cache misses, the request is sent to the L3 cache. The L3 cache then checks to see if another L2 (inclusive to the L1 cache) has the line or if the L4 cache or memory must be searched.

Figure 2:
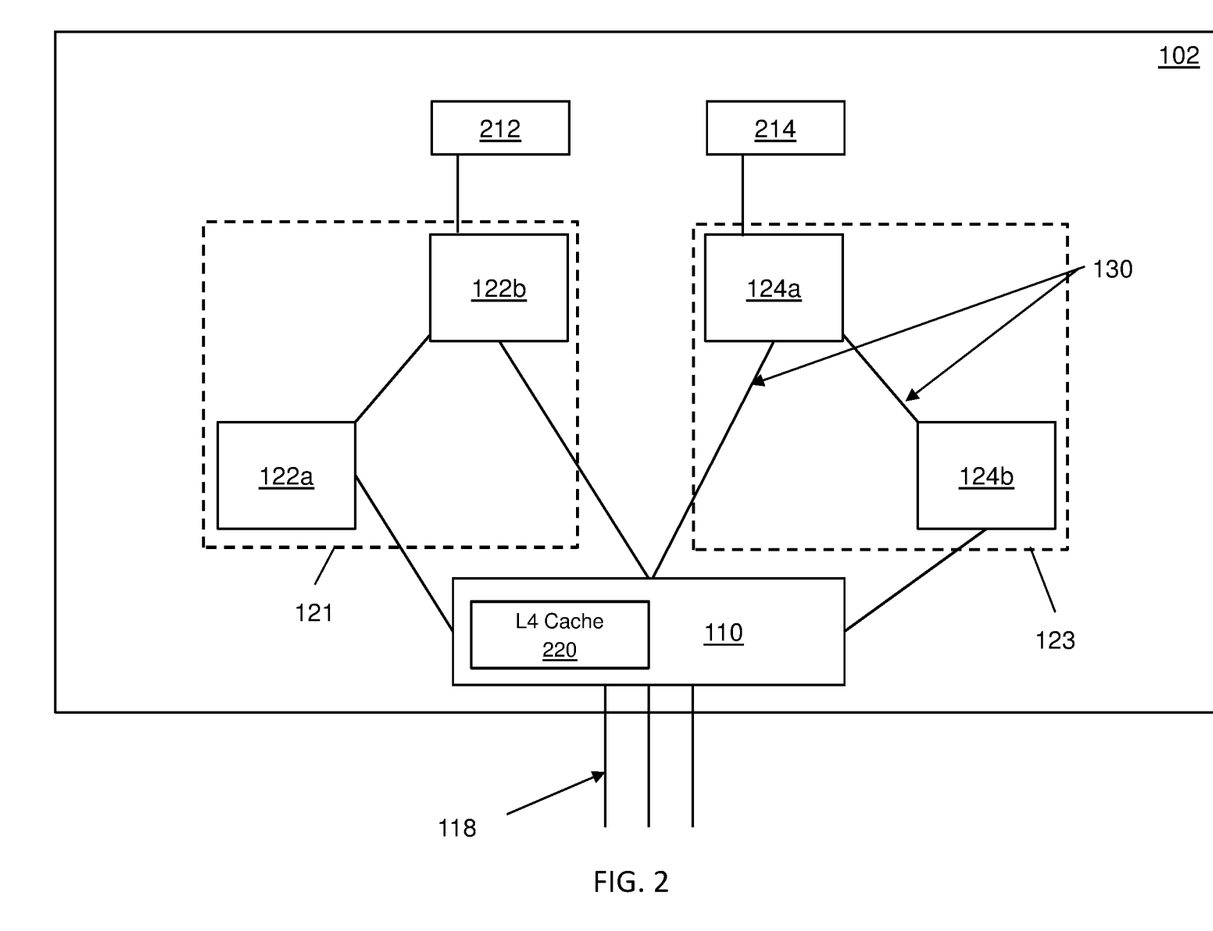
FIG. 2 depicts a block diagram of a drawer in a distributed symmetric multiprocessing (SMP) system in accordance with one or more embodiments of the invention.

FIG. 2 depicts drawer 102 in greater detail, according to one or more embodiments. Although FIG. 2 depicts only drawer 102, it should be appreciated that a similar configuration is contemplated for drawers 104, 106, 108, 109 and/or other drawers in system 100. Referring now to FIG. 2, drawer 102 includes two CP clusters (e.g., CP cluster 121 and CP cluster 123). Each CP cluster contains individual CP chips. For example, CP cluster 121 contains CP chips 122a and 122b; and CP cluster 123 contains CP chips 124a and 124b. Each of the individual CP chips (e.g., CP chips 122a, 122b, 124a, 124b) has multiple processing cores (e.g., 2 processing cores, 8 processing cores, 10 processing cores, etc.) and each processing core has its own private L1 and L2 cache. The processing cores within each individual CP chip share an L3 cache at the CP level. For example, the CP 122a includes multiple processing cores that each has its own L1/L2 cache and the multiple processing cores within the CP 121 share an L3 cache. Each respective CP chip may be connected to system memory (e.g., system memory 212 and system memory 214). CP chip 121 is operatively connected with each of the other clusters (e.g., 123) via bus lines 130 through the SC chip 110. In other aspects, a CP cluster may include any number of CP chips, although embodiments are described as having only three.

The SC chip 110 includes interconnects for communication with each CP chip (e.g., CP chips 122a, 122b, 124a, 124b) in both clusters 121, 123 on the drawer 102 and for communication with other SC chips on other drawers (e.g., the SC 112 of the drawer 104, the SC 114 of the drawer 106, the SC 116 of the drawer 108, the SC 117 of the drawer 109, etc.). In one or more embodiments of the invention, the SC chip 110 includes an L4 cache 220 and directory that includes the L4 cache and a directory of the state bits.

Figure 3:
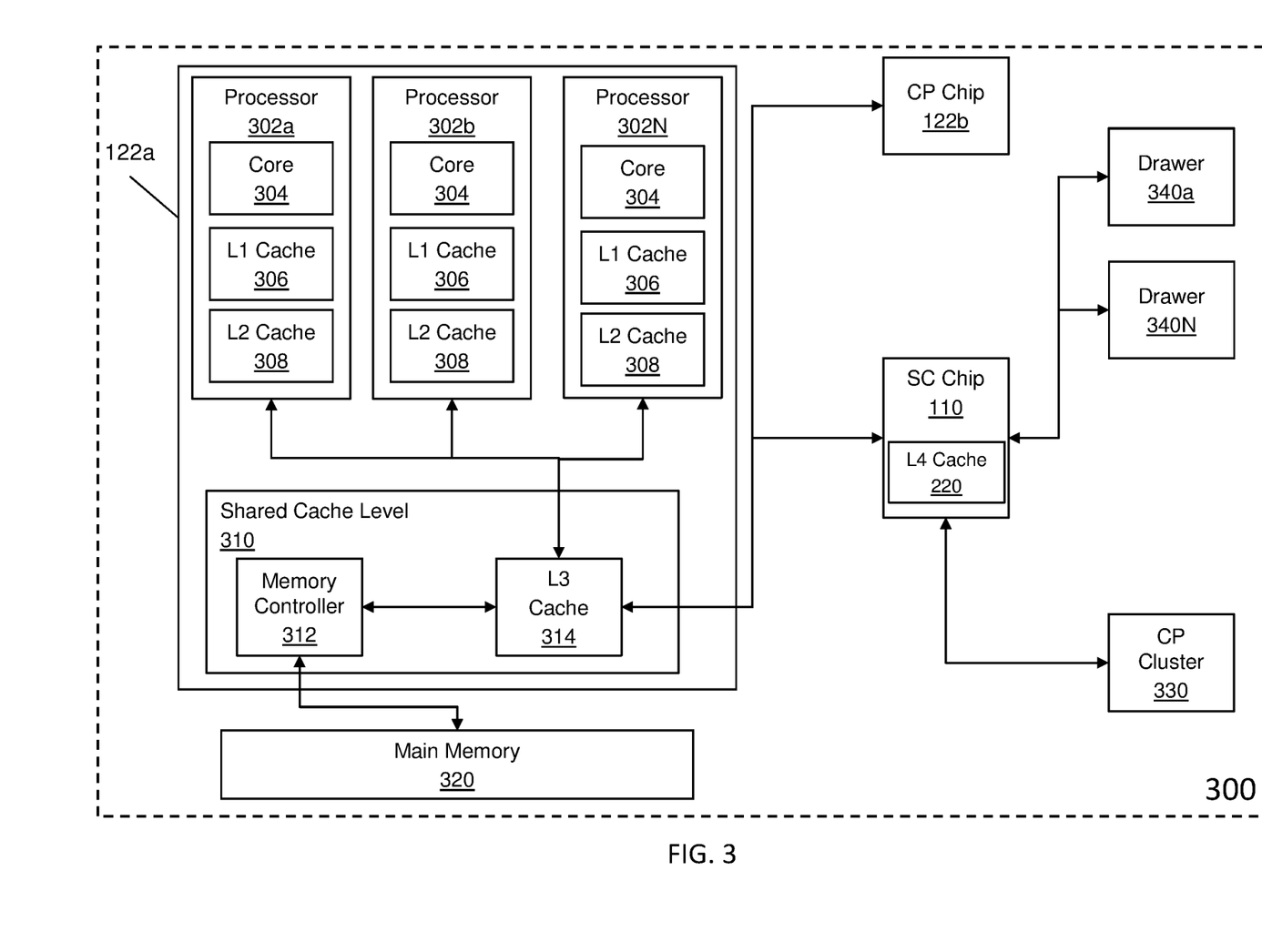
FIG. 3 depicts a block diagram of an exemplary symmetric multiprocessor (SMP) computer according to one or more embodiments of the invention.

FIG. 3 depicts a block diagram of an exemplary symmetric multiprocessor (SMP) computer according to one or more embodiments of the present invention. The system 300 includes several CP clusters 330a-330N (where N is any whole number greater than or equal to 1) which may be directly connected or connected through other SC chips. As described in FIG. 2, each CP cluster includes three CP chips. CP chip 122a is depicted in greater detail in FIG. 3. CP chip 122a includes processors 302a-302N (where N is any whole number greater than 2). Each processor has one or more cores 304, an L1 cache 306, and an L2 cache 308. Each processor within the CP chip 122a is communicative coupled to an L3 cache 314 on a shared cache level 310. The memory controller 312 can access the L3 cache 314. In one or more embodiments, each of the processors 302a-302N share the L3 cache on the CP chip 122a. The memory controller 312 with the L3 cache implements a shared cache level 310 across a CP cluster in the system 300.

The main memory 320 can include a random access store of program data and program instructions for data processing on the system 300. Main memory 320 is characterized by memory latency, the time required for a memory access, a read or write to or from main memory.

The L1 cache 306 and L2 cache 308 along with the L3 cache 314 are specialized segments of memory used by the processors 302a-302N to reduce memory access latency. Each cache is smaller and faster than main memory 320, and each cache stores copies of data from frequently used main memory locations. When a processor needs to read from or write to a location in memory, it first checks whether a copy of that data, a "cache line," is in a cache.

In the examples of FIG. 3, when a processor 302a on CP chip 308 in CP cluster 121 (from FIG. 2) experiences a cache miss for a cache line in the L3 cache 314, which of course follows a cache miss on L1 306 and L2 308, the memory controller 312 broadcasts to the other CP chip 122b and the SC Chip 110 a coherency request for the cache line. The request is sent to the other L3 caches on the CP cluster 330 and to the SC Chip 220 which checks its L4 cache 220 and the other drawers 340a . . . 340N to check for the cache line. The L4 cache 220 can look up its own directory to see if the cache line is owned on the drawer and it can tell if the other cluster L3 cache has the cache line since the L4 cache is inclusive of all L3 caches. If either of the CP chip 122b or the SC Chip 220 does have the line it will be returned from one of these locations. If neither the other CP chip 122b nor the SC Chip 220 have the cache line, the CP Chips 122b or the SC Chip 220 requests the cache line from the other cache levels on other clusters or drawers that does have it. At this point in processing, if the memory controller 312 cannot retrieve the cache line from the other Drawers 340a . . . 330N or CP Cluster 330, it would be forced to retrieve the cache line from main memory.

Typically, when a cache line is fetched from main memory, the memory controller 312 sources the cache line and the L3 cache 314 installs the cache line internally for the requesting CP chip, herein 122a. In addition, the L3 cache 314 sources the fetched cache line for the L4 cache 220 to install the cache line internally. Due to the limited size of the L3 cache 314 (typically 256 megabytes), when the L3 cache 314 is full, an already stored cache line is evicted from the L3 cache 314 and stored in the L4 cache 220. This eviction takes place to allow for storage of the retrieved cache line from main memory 320 in the L3 cache 314. The evicted cache line can be selected based on an eviction algorithm such as, for example, a least recently used (LRU) eviction algorithm. Typically, the retrieved cache line from main memory 320 is also stored in the L4 cache 220 to maintain inclusivity between the cache levels. Installing a cache line into the L4 cache allows for quicker cross drawer data latency. This is achieved when the SC chips (for example, SC chip 110) can send data between each other without fetching from their connected L3 caches. The L3 cache and the L4 cache coordinate the directory installation state, not the memory controllers. However, this can cause increased traffic on the bus lines between the CP chip 122a and the SC chip 110 because two cache lines (directory state and data) are being transferred to the L4 cache 220 (i.e., the evicted cache line and the retrieved cache line from memory). A high-speed bus, such as an X-Bus, is utilized to transmit data between the caches on the CP Chips 122a, 122b, 122c and the SC Chip 110. As mentioned above, when a cache line is retrieved from main memory 320, the cache line is stored in the L3 cache 314 and a stored cache line is evicted to the lower level cache and, to maintain inclusivity between the caches, the retrieved cache line is stored in the lower level cache as well. This transmission of two cache lines over the X-Bus can result in a bottleneck whenever a cache line is retrieved from main memory 320. Embodiments of the invention, seek to avoid sending data to a lower cache level (e.g., the L4 cache 220) to reduce the data traffic over the bus between the CP chip 122a and the SC Chip 110. Instead, the memory controller 312 can create a directory state, based on a request from the L3 Cache 314, in the lower level cache (i.e., L4 Cache 220) for the retrieved cache line and store this directory state but not send any of the cache line data to the L4 cache 220. The L4 cache 220 creates a directory entry but does not store any data because it did not receive data from the L3 cache 314, only the directory state. That is to say, a directory entry is created but no data is stored in the L4 cache 220 for this cache line. This has the added benefit of reducing data traffic over the bus line because no-data is transferred when storing the directory state in the L4 cache 220. The bus line is only utilized to transfer the directory state which can reduce the load on the bus line. For example, a directory state transfer from the CP Chip 122a to the L4 cache 220 may take 1 clock cycle to complete. Also, a requestor's snoop request that contains directory state information, from the CP Chip 122a to the L4 cache 220 may take 1 clock cycle to complete as well. The beginning of a read-only or exclusive request is referred to as a snoop. The snoop contains a portion of the L3 cache 314 directory state that the L4 cache 220 uses to create its director entry. In embodiments, the L3 cache 314 directory can be included in later messages to the L4 cache 220. A data transfer of the cache line from the CP Chip 122a to the L4 cache 220 may take 16 clock cycles. Also, in one or more embodiments of the invention, only a subset of the directory entry for the L4 to create is sent along the X-Bus which is the directory state.

In one or more embodiments of the invention, the L4 cache 220 stores the directory state and a no-data from the retrieve cache line. When there is an eviction of the previously retrieved cache line from the L3 cache 314 based on an event, the previously retrieved cache line is evicted from the L3 cache 314 and stored in the L4 cache 220 at the directory state. This allows for the data of the previously retrieved cache line to be stored in the L4 cache 220 only when it is evicted from the L3 cache 314 thus saving on bus line traffic between the CP Chip 122a and the SC Chip 110. In one or more embodiments of the invention, if the cache line is installed in the no-data in L4 state on a CP, this state is preserved when a fetch request from the other CP on the cluster is received. That is to say, the no-data in L4 state into the directory on a requesting CP is installed. This is only for requests cross cluster, so if the cache line is ever sent off cluster the No data in L4 state is no longer preserved and the data in the L4 is installed.

The basic two types of fetches are Exclusive and Read Only (RO). An Exclusive fetch implies that the core wants the only core with a copy of the line, most likely they want to modify the data. The L3s also invalidate their copies if they are not connected to the requesting core. A core must own a line Exclusive before it can store to it. A RO fetch implies that the core does not intend to change the data and the information can therefore be shared amongst cores. A part of inclusive shared caches is maintaining the information of clients that own the line. For example, the L3 stores which cores own the line. The L4 stores which L3s own the line.

Figure 4:
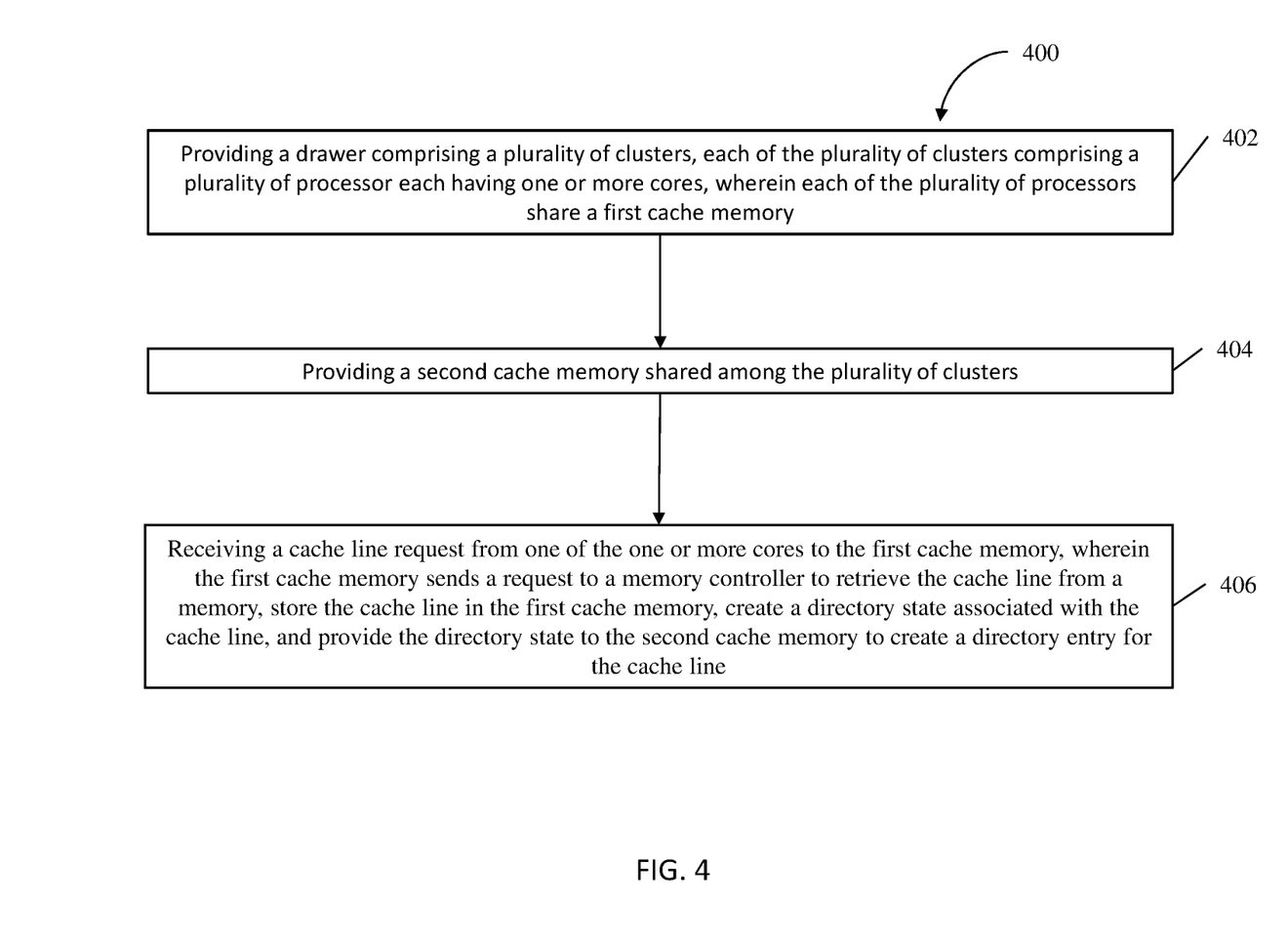
FIG. 4 depicts a flow diagram of a method for cache management in a distributed symmetric multiprocessing computer according to one or more embodiments of the invention.

FIG. 4 depicts a flow diagram of a method for cache management in a distributed symmetric multiprocessing computer according to one or more embodiments of the invention. The method 400 includes providing a drawer (102 from FIG. 2) comprising a plurality of clusters (122a, 122b from FIG. 2), each of the plurality of clusters comprising a plurality of processor (302a, 302b, . . . , 302N from FIG. 3) each having one or more cores (304 from FIG. 3), wherein each of the plurality of processors shares a first cache memory (314 from FIG. 3), as shown in block 402. The method 400, at block 404, includes providing a second cache memory shared among the plurality of clusters. And at block 406, the method 400 includes receiving a cache line request from one of the one or more cores to the first cache memory (314), wherein the first cache memory sends a request to a memory controller (312) to retrieve the cache line from a memory, store the cache line in the first cache memory, create a directory state associated with the cache line, and provide the directory state to the second cache memory to create a directory entry for the cache line.

Additional processes may also be included. It should be understood that the processes depicted in FIG. 4 represent illustrations and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    providing a drawer comprising a plurality of clusters, each of the plurality of clusters comprising a plurality of processors each having one or more cores, wherein each of the one or more cores shares a first cache memory;
    providing a second cache memory shared among the plurality of clusters; and
    receiving a cache line request from one of the one or more cores to the first cache memory, wherein the first cache memory sends a request to a memory controller to:
    retrieve the cache line from a memory;
    store the cache line in the first cache memory;
    create a directory state associated with the cache line; and
    provide the directory state to the second cache memory to create a directory entry for the cache line;
    wherein the first cache memory comprises a directory to store a plurality of state bits;
    wherein creating a directory state associated with the cache line comprises creating a no-data state; and
    wherein the no-data state comprises the directory state and a null value; and
    responsive to an eviction of the cache line from the first cache memory, sending, by the first cache memory, a request to the memory controller to store the first cache line in the second cache memory at the directory entry based on the directory state.

2. The computer-implemented method of claim 1, further comprising:
    responsive to retrieving the cache line from the memory, evicting a second cache line from the first cache memory.

3. The computer-implemented method of claim 2, wherein the evicting the second cache line from the first cache memory comprises storing the second cache line in the second cache memory.

4. The computer-implemented method of claim 1, wherein each of the plurality of processors comprises a plurality of processing cores having a private Level 1 cache and a private Level 2 cache.

5. The computer-implemented method of claim 1, wherein the memory is a main memory.

6. The computer-implemented method of claim 1, wherein the first cache memory is a shared Level 3 cache.

7. The computer-implemented method of claim 1, wherein the second cache memory is a shared Level 4 cache.

8. A system comprising:
    a drawer comprising a plurality of clusters, each of the plurality of clusters comprising a plurality of processors each having one or more cores, wherein each of the one or more cores shares a first cache memory; and
    a second cache memory shared among the plurality of clusters;
    wherein the first cache memory is configured to receive a cache line request from one of the plurality of cores and send a request to a memory controller to:
    retrieve the cache line from a memory;
    provide the cache line to the first cache memory;
    create a directory state associated with the cache line; and
    provide the directory state to the second cache memory to create a directory entry for the cache line;
    wherein the first cache memory comprises a directory to store a plurality of state bits;
    wherein creating a directory state associated with the cache line comprises creating a no-data state; and
    wherein the no-data state comprises the directory state and a null value; and
    responsive to an eviction of the cache line from the first cache memory, sending, by the first cache memory, a request to the memory controller to store the first cache line in the second cache memory at the directory entry based on the directory state.

9. The system of claim 8, wherein the first cache memory is further configured to:
    responsive to retrieving the cache line from the memory, evict a second cache line from the first cache memory.

10. The system of claim 9, wherein the evicting the second cache line from the first cache memory comprises storing the second cache line in the second cache memory.

11. The system of claim 8, wherein each of the plurality of processors comprises a plurality of processing cores having a private Level 1 cache and a private Level 2 cache.

12. The system of claim 8, wherein the memory is a main memory.

13. A symmetric multiprocessing computing system comprising:
   a plurality of drawers, each drawer comprising:
      a plurality of clusters, each of the plurality of clusters comprising a plurality of processors each having one or more cores, wherein each of the one or more cores shares a first cache memory; and
      a second cache memory shared among the plurality of clusters;
      wherein the first cache memory is configured to receive a cache line request from one of the one or more cores and send a request to a memory controller to:
         retrieve the cache line from a memory;
         store the cache line in the first cache memory;
         create a directory state associated with the cache line; and
      provide the directory state to the second cache memory to create a directory entry for the cache line;
      wherein the first cache memory comprises a directory to store a plurality of state bits;
      wherein creating a directory state associated with the cache line comprises creating a no-data state; and
      wherein the no-data state comprises the directory state and a null value; and
      responsive to an eviction of the cache line from the first cache memory, sending, by the first cache memory, a request to the memory controller to store the first cache line in the second cache memory at the directory entry based on the directory state.

* * * * *